US011628427B2

United States Patent
Wang et al.

(10) Patent No.: US 11,628,427 B2
(45) Date of Patent: *Apr. 18, 2023

(54) SEGREGATION INDUCED CORE-SHELL STRUCTURE

(71) Applicant: UCHICAGO ARGONNE, LLC, Chicago, IL (US)

(72) Inventors: Rongyue Wang, Naperville, IL (US); Vojislav Stamenkovic, Naperville, IL (US); Gregory K. Krumdick, Homer Glen, IL (US); Krzysztof Pupek, Plainfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/161,114

(22) Filed: Jan. 28, 2021

(65) Prior Publication Data

US 2021/0252487 A1    Aug. 19, 2021

Related U.S. Application Data

(60) Provisional application No. 62/966,929, filed on Jan. 28, 2020.

(51) Int. Cl.
*B01J 23/89* (2006.01)
*B01J 35/00* (2006.01)
(Continued)

(52) U.S. Cl.
CPC .............. *B01J 23/892* (2013.01); *B01J 23/42* (2013.01); *B01J 35/0013* (2013.01);
(Continued)

(58) Field of Classification Search
CPC .... B01J 23/892; B01J 37/0072; B01J 37/009; B01J 37/031; B01J 37/04; B01J 37/06; B01J 37/14; B01J 37/343
See application file for complete search history.

(56) References Cited

U.S. PATENT DOCUMENTS

| 5,879,827 A | 3/1999 | Debe et al. |
| 7,252,698 B2 | 8/2007 | Mirkin et al. |

(Continued)

FOREIGN PATENT DOCUMENTS

| CN | 105234427 A | 1/2016 |
| WO | WO-2011/112608 A1 | 9/2011 |
| WO | WO-2011/139705 A1 | 11/2011 |

OTHER PUBLICATIONS

Gocyla et al., Shape Stability of Octahedral PtNi Nanocatalysts for Electrochemical Oxygen Reduction Reaction Studied by in situ Transmission Electron Microscopy, ACS Nano 2018, 12, 5306-5311.*

(Continued)

*Primary Examiner* — Jun Li
(74) *Attorney, Agent, or Firm* — Foley & Lardner LLP

(57) ABSTRACT

A process for synthesis of PtNi high surface area core/shell particles. The processing including formation of PtNi nanoparticles, exposure of the PtNi nanoparticles to oxygen to form a nickel oxide coating on the nanoparticles at the same time the segregation of Ni to surface induces a Pt-skin with PtNi core structure, removal of the nickel oxide coating to form PtNi core/Pt shell (or Pt-skin) structure.

14 Claims, 19 Drawing Sheets

(51) Int. Cl.
- B01J 37/03 (2006.01)
- B01J 37/04 (2006.01)
- B01J 37/06 (2006.01)
- B01J 37/14 (2006.01)
- B01J 37/34 (2006.01)
- B01J 23/42 (2006.01)
- B01J 37/00 (2006.01)

(52) U.S. Cl.
CPC ......... B01J 37/009 (2013.01); B01J 37/0072 (2013.01); B01J 37/031 (2013.01); B01J 37/04 (2013.01); B01J 37/06 (2013.01); B01J 37/14 (2013.01); B01J 37/343 (2013.01)

(56) References Cited

U.S. PATENT DOCUMENTS

| | | | |
|---|---|---|---|
| 7,622,217 | B2 | 11/2009 | Debe et al. |
| 7,871,738 | B2 | 1/2011 | Stamenkovic et al. |
| 8,178,463 | B2 | 5/2012 | Stamenkovic et al. |
| 8,685,878 | B2 | 4/2014 | Stamenkovic et al. |
| 9,246,177 | B2 | 1/2016 | Stamenkovic et al. |
| 9,735,432 | B2 | 8/2017 | Cho et al. |
| 10,099,207 | B2 | 10/2018 | Stamenkovic et al. |
| 2002/0194958 | A1 | 12/2002 | Lee et al. |
| 2004/0072061 | A1 | 4/2004 | Nakano et al. |
| 2006/0083970 | A1 | 4/2006 | Shibutani et al. |
| 2009/0247400 | A1 | 10/2009 | Stamenkovic et al. |
| 2010/0008840 | A1 | 1/2010 | Zhong et al. |
| 2010/0086832 | A1 | 4/2010 | Lopez et al. |
| 2010/0092841 | A1 | 4/2010 | Lopez et al. |
| 2010/0105548 | A1* | 4/2010 | Zhang .................. H01M 4/925 502/313 |
| 2010/0197490 | A1 | 8/2010 | Adzic et al. |
| 2011/0077147 | A1 | 3/2011 | Stamenkovic et al. |
| 2011/0159365 | A1 | 6/2011 | Loveness et al. |
| 2011/0167962 | A1 | 7/2011 | Ghanavi et al. |
| 2011/0189589 | A1 | 8/2011 | Erlebacher et al. |
| 2011/0207019 | A1* | 8/2011 | Mukerjee et al. .... H01M 4/926 |
| 2013/0053239 | A1 | 2/2013 | Carpenter |
| 2013/0085061 | A1 | 4/2013 | Stamenkovic et al. |
| 2013/0133483 | A1 | 5/2013 | Yang et al. |
| 2013/0178357 | A1 | 7/2013 | Adzic et al. |
| 2015/0017570 | A1 | 1/2015 | Yang et al. |
| 2015/0132683 | A1 | 5/2015 | Shirvanian |
| 2015/0236355 | A1 | 8/2015 | Yang et al. |
| 2016/0233516 | A1 | 8/2016 | Nakamura et al. |
| 2018/0281060 | A1 | 10/2018 | Yang et al. |
| 2019/0372128 | A1 | 12/2019 | Stamenkovic et al. |
| 2019/0379059 | A1 | 12/2019 | Stamenkovic et al. |

OTHER PUBLICATIONS

Alia et al. (Oxidation of Platinum Nickel Nanowires to Improve Durability of Oxygen-Reducing Electrocatalysts, 2016, J. Electrochem. Soc. 163 F296).*
Li, et al., "Controllable Preparation of Nanoparticles by Drops and Plugs Flow in a Microchannel Device," Langmuir 24(8), pp. 4194-4199 (2008).
Mokari, "Synthesis and characterization of hybrid nanostructures," Nano Reviews 2(1):5983, 9 pages (2011).
Niu, et al., "Supporting Information for: Synthesis of Pt—Ni Octahedra in Continuous-Flow Droplet Reactors for the Scalable Production of Highly Active Catalysts toward Oxygen Reduction," Nano Letters 16(6), pp. S1-S13 (2015).
Stamenkovic & Markovic, "Tailored High Performance Low-PGM Alloy Cathode Catalysts," 2018 DOE Hydrogen and Fuel Cells Program Review, Project ID# FC140, retrieved from https://www.hydrogen.energy.gov/pdfs/review18/01_satyapal_plenary_2018_amr.pdf, 36 pages (2018).
"A matter of scale," Nature Nanotechnology 11, p. 773 (2016).

Ahrenstorf, et al., "Colloidal Synthesis of NixPt1-x Nanoparticles with Tuneable Composition and Size," Small 3(2), pp. 271-274 (2007).
Armstrong, et al., "Evaluating the performance of nanostructured materials as lithium-ion battery electrodes," Nano Research 7(1), pp. 1-62 (2014).
Banham & Ye, "Current Status and Future Development of Catalyst Materials and Catalyst Layers for Proton Exchange Membrane Fuel Cells: An Industrial Perspective," ACS Energy Letters 2(3), pp. 629-638 (2017).
Baskes & Johnson, "Modified embedded atom potentials for HCP metals," Modelling and Simulation in Materials Science and Engineering 2, pp. 147-163 (1994).
Baskes, "Modified embedded-atom potentials for cubic materials and impurities," Physical Review B 46(5), pp. 2727-2742 (1992).
Carey, "Dichlorobenzene," Encyclopaedia Britannica, retrieved from https://www.britannica.com/science/dichlorobenzene, 1 page (2008).
Cargnello, et al., "Control of Metal Nanocrystal Size Reveals Metal-Support Interface Role for Ceria Catalysts," Science 341(6147), pp. 771-773 (2013).
Chadi & Cohen, "Special Points in the Brillouin Zone," Physical Review 8(12), pp. 5747-5753 (1973).
Chen, et al., "Highly Crystalline Multimetallic Nanoframes with Three-Dimensional Electrocatalytic Surfaces," Science 343(6177), pp. 1339-1343 (2014).
Choi, et al., "Gram-scale synthesis of highly active and durable octahedral PtNi nanoparticle catalysts for proton exchange membrane fuel cell," Applied Catalysis B: Environmental 225, pp. 530-537 (2018).
Choi, et al., "Synthesis and Characterization of 9 nm Pt—Ni Octahedra with a Record High Activity of 3.3 A/mgPt for the Oxygen Reduction Reaction," Nano Letters 13(7), pp. 3420-3425 (2013).
Cui, et al., "Compositional segregation in shaped Pt alloy nanoparticles and their structural behavior during electrocatalysis," Nature Materials 12, pp. 765-771 (2013).
Dahmani, et al., "Ni—Pt Phase Diagram: Experiment and Theory," Physical Review Letters 55(11), pp. 1208-1211 (1985).
Davis, "Ordered porous materials for emerging applications," Nature 417, pp. 813-821 (2002).
Debe, "Electrocatalyst approaches and challenges for automotive fuel cells," Nature 486, pp. 43-51 (2012).
Dubau, et al., "Tuning the Performance and the Stability of Porous Hollow PtNi/C Nanostructures for the Oxygen Reduction Reaction," ACS Catalysis 5(9), pp. 5333-5341 (2015).
Erlebacher, et al., "Evolution or nanoporosity in dealloying," Nature 410, pp. 450-453 (2001).
Ferreira, et al., "Instability of Pt?/?C Electrocatalysts in Proton Exchange Membrane Fuel Cells: A Mechanistic Investigation," Journal of the Electrochemical Society 152(11), pp. A2256-A2271 (2005).
Fu, et al., "Three-dimensional PtNi hollow nanochains as an enhanced electrocatalyst for the oxygen reduction reaction," Journal of Materials Chemistry A 4, pp. 8755-8761 (2016).
Gasteiger, et al,. "Activity benchmarks and requirements for Pt, Pt-alloy, and non-Pt oxygen reduction catalysts for PEMFCs," Applied Catalysis B: Environmental 56(1-2), pp. 9-35 (2005).
Grass, et al., "New ambient pressure photoemission endstation at Advanced Light Source beamline 9.3.2," Review of Scientific Instruments 81, 053106, 7 pages (2010).
Greeley, et al., "Electronic Structure and Catalysis on Metal Surfaces," Annual Review of Physical Chemistry 53, pp. 319-348 (2002).
Guo, et al., "Tuning Nanoparticle Catalysis for the Oxygen Reduction Reaction," Angewandte Chemie 52(33), pp. 8526-8544 (2013).
Hammer, et al., "Improved adsorption energetics within density-functional theory using revised Perdew-Burke-Ernzerhof functionals," Physical Review B 59(11), pp. 7413-7421 (1999).
Han, et al., "Record activity and stability of dealloyed bimetallic catalysts for proton exchange membrane fuel cells," Energy & Environmental Science 8, pp. 258-266 (2015).

(56) References Cited

OTHER PUBLICATIONS

Herron, et al., "Oxygen Reduction Reaction on Platinum-Terminated "Onion-structured" Alloy Catalysts," Electrocatalysis 3(3-4), pp. 192-202 (2012).
Jaco & Goddard, "Adsorption of Atomic H and O on the (111) Surface of Pt3Ni Alloys," The Journal of Physical Chemistry B 108(24), pp. 8311-8323 (2004).
Johnson, et al., "Ordered Mesoporous Polymers of Tunable Pore Size from Colloidal Silica Templates," Science 283(5404), pp. 963-965 (1999).
Kang, et al., "Heterogeneous Catalysts Need not be so 'Heterogeneous': Monodisperse Pt Nanocrystals by Combining Shape-Controlled Synthesis and Purification by Colloidal Recrystallization," Journal of the American Chemical Society 135(7), pp. 2741-2747 (2013).
Kang, et al., "Shape-Controlled Synthesis of Pt Nanocrystals: The Role of Metal Carbonyls," ACS Nano 7(1), pp. 645-653 (2013).
Kirkland, et al., "Simulation of annular dark field stem images using a modified multislice method," Ultramicroscopy 23(1), pp. 77-96 (1987).
Klenov &Stemmer, "Contributions to the contrast in experimental high-angle annular dark-field images," Ultramicroscopy 106(10), pp. 889-901 (2006).
Koh & Strasser, "Electrocatalysis on Bimetallic Surfaces:? Modifying Catalytic Reactivity for Oxygen Reduction by Voltammetric Surface Dealloying," Journal of the American Chemical Society 129(42), pp. 12624-12625 (2007).
Li, et al., "Surfactant Removal tor Colloidal Nanoparticles from Solution Syntnesis: The Effect on Catalytic Performance," ACS Catalysis 2(7), pp. 1358-1362 (2012).
Liu, et al., "Self-Terminating Growth of Platinum Films by Electrochemical Deposition," Science 338(6112), pp. 1327-1330 (2012).
Liu, et al., "Synthesis and activation of Pt nanoparticles with controlled size for fuel cell electrocatalysts," Journal of Power Sources 164(2), pp. 472-480 (2007).
Lohse, et al., "A Simple Millifluidic Benchtop Reactor System for the High-Throughput Synthesis and Functionalization of Gold Nanoparticles with Different Sizes and Shapes," ACS Nano 7(5), pp. 4135-4150 (2013).
Lopes, et al., "Relationships between Atomic Level Surface Structure and Stability/Activity of Platinum Surface Atoms in Aqueous Environments," ACS Catalysis, 6(4), pp. 2536-2544 (2016).
MacDonald, et al., "Hybrid Nanoscale Inorganic Cages," Nature Materials 9, pp. 810-815 (2010).
Mahmoud, et al., "Following Charge Separation on the Nanoscale in Cu2O—Au Nanoframe Hollow Nanoparticles," Nano Letters 11(8), pp. 3285-3289 (2011).
McEachran, et al., "Ultrathin Gold Nanoframes through Surfactant-Free Templating of Faceted Pentagonal Silver Nanoparticles," Journal of the American Chemical Society 133(21), pp. 8066-8069 (2011).
Nellist & Pennycook, "Incoherent imaging using dynamically scattered coherent electrons," Ultramicroscopy 78(1-4), pp. 111-124 (1999).
Niu & Li, "Removal and Utilization of Capping Agents in Nanocatalysis," Chemistry of Materials 26(1), pp. 72-83 (2014).
Niu, et al., "Synthesis of Pt—Ni Octahedra in Continuous-Flow Droplet Reactors for the Scalable Production of Highly Active Catalysts toward Oxygen Reduction," Nano Letters 16(6), pp. 3850-3857 (2015).
Niu, et al., "Toward continuous and scalable production of colloidal nanocrystals by switching from batch to droplet reactors," Chemical Society Reviews 44(16), pp. 5806-5820 (2015).
Oh, et al., "Galvanic Replacement Reactions in Metal Oxide Nanocrystals," Science 340(6135), pp. 964-968 (2013).
Oszajca, et al., "Precisely Engineered Colloidal Nanoparticles and Nanocrystals for Li-Ion and Na-Ion Batteries: Model Systems or Practical Solutions?," Chemistry of Materials 26(19), pp. 5422-5432 (2014).

Park & Xia, "Macroporous Membranes with Highly Ordered and Three-Dimensionally Interconnected Spherical Pores," Advanced Materials 10(13), pp. 1045-1048 (1998).
Perdew, et al., "Atoms, molecules, solids, and surfaces: Applications of the generalized gradient approximation for exchange and correlation," Physical Review B 46(11), pp. 6671-6687 (1992).
Pupek, "Continuous Flow Synthesis, a Platform to Accelerate the Transition of Nanomaterials to Manufacturing," Informatics, Electronics and Microsystems: TechConnect Briefs 2018, pp. 130-133 (2018).
Schlogl, et al., "Ambient Pressure Photoelectron Spectroscopy: A new toolfor surface science and nanotechnology," Surface Science Reports 63(4), pp. 169-199 (2008).
Shao, et al., "Recent Advances in Electrocatalysts for Oxygen Reduction Reaction," Chemical Reviews 116(6), pp. 3594-3657 (2016).
Skrabalak, et al., "Gold Nanocages: Synthesis, Properties, and Applications," Accounts of Chemical Research 41(12), pp. 1587-1595 (2008).
Snyder, et al., "Oxygen reduction in nanoporous metal-ionic liquid composite electrocatalysts," Nature Materials 9, pp. 904-907 (2010).
Snyder, et al., "Oxygen Reduction Reaction Performance of [MTBD][beti]-Encapsulated Nanoporous NiPt Alloy Nanoparticles," Advanced Functional Materials 23(44), pp. 5494-5501 (2013).
Snyder, et al., "Structure/Processing/Properties Relationships in Nanoporous Nanoparticles as Applied to Catalysis of the Cathodic Oxygen Reduction Reaction," Journal of the American Chemical Society 134(20), pp. 8633-8645 (2012).
Stamenkovic, et al., "Effect of Surface Composition on Electronic Structure, Stability, and Electrocatalytic Properties of Pt-Transition Metal Alloys: Pt-Skin versus Pt-Skeleton Surfaces," Journal of the American Chemical Society 128(27), pp. 8813-8819 (2006).
Stamenkovic, et al., "Improved Oxygen Reduction Activity on Pt3Ni(111) via Increased Surface Site Availability," Science 315(5811), pp. 493-497 (2007).
Stamenkovic, et al., "Surface Composition Effects in Electrocatalysis: Kinetics of Oxygen Reduction on Well Defined Pt3Ni and Pt3Co Alloy Surfaces," Journal of Physical Chemistry B 106(46), pp. 11970-11979 (2002).
Stephens, et al., "Toward sustainable fuel cells," Science 354(6318), pp. 1378-1379 (2016).
Strasser, "Catalysts by Platonic design," Science 349(6246), pp. 379-380 (2015).
Subbaraman, et al., "Enhancing Hydrogen Evolution Activity in Water Splitting by Tailoring Li—Ni(OH)2-Pt Interfaces," Science 334(6060), pp. 1256-1260 (2011).
Sun & Xia, "Shape-Controlled Synthesis of Gold and Silver Nanoparticles," Science 298(5601), pp. 2176-2179 (2002).
Sun, et al., "Template-Engaged Replacement Reaction: A One-Step Approach to the Large-Scale Synthesis of Metal Nanostructures with Hollow Interiors," Nano Letters 2(5), pp. 481-485 (2002).
Tang, et al., "Electrochemical Stability of Nanometer-Scale Pt Particles in Acidic Environments," Journal of the American Chemical Society 132(2), pp. 596-600 (2010).
Tao, et al., "Reaction-Driven Restructuring of Rh—Pd and Pt—Pd Core-Shell Nanoparticles," Science 322(5903), pp. 939-934 (2008).
Tsao & Yang, "Continuous Production of Carbon-Supported Cubic and Octahedral Platinum-Based Catalysts Using Conveyor Transport System," Small 12(35), pp. 4808-4814 (2016).
Van Der Vliet, et al., "Mesostructured thin films as electrocatalysts witn tunable composition and surface morphology," Nature Materials 11, pp. 1051-1058 (2012).
Van Der Vliet, et al., "Unique Electrochemical Adsorption Properties of Pt-Skin Surfaces," Angewandte Chemie 124(13), pp. 3193-3196 (2012).
Vanderbilt, "Soft self-consistent pseudopotentials in a generalized eigenvalue formalism," Physical Review B 41(11), pp. 7892-7895 (1990).
Wang & Li, et al., "Effective Octadecylamine System for Nanocrystal Synthesis," Inorganic Chemistry 50(11), pp. 5196-5202 (2011).
Wang et al., "Monodisperse Pt3Co Nanoparticles as a Catalyst for the Oxygen Reduction Reaction: Size-Dependent Activity," The Journal of Physical Chemistry C 113(45), pp. 19365-19368 (2009).

(56) References Cited

OTHER PUBLICATIONS

Wang, et al., "Design and Synthesis of Bimetallic Electrocatalyst with Multilayered Pt-Skin Surfaces," Journal of the American Chemical Society 133(36), pp. 14396-14403 (2011).

Wang, et al., "Kirkendall Effect and Lattice Contraction in Nanocatalysts: A New Strategy to Enhance Sustainable Activity," Journal of the American Chemical Society 133(34), pp. 13551-13557 (2011).

Wang, et al., "One-Pot Solution Synthesis of Cubic Cobalt Nanoskeletons," Advanced Materials 21(16), pp. 1636-1640 (2009).

Wang, et al., "Phase and Interface Engineering of Platinum-Nickel Nanowires for Efficient Electrochemical Hydrogen Evolution," Angewandte Chemie 55(41), pp. 12859-12863 (2016).

Wang, et al., "Structurally ordered intermetallic platinum-cobalt core-shell nanoparticles with enhanced activity and stability as oxygen reduction electrocatalysts," Nature Materials 12, pp. 81-87 (2013).

Wang, et al., "Synthesis of Monodisperse Pt Nanocubes and Their Enhanced Catalysis for Oxygen Reduction," Journal of the American Chemical Society 129(22), pp. 6974-6975 (2007).

White & Bird, "Implementation of gradient-corrected exchange-correlation potentials in Car-Parrinello total-energy calculations," Physical Review B 50(7), pp. 4954-4957 (1994).

Wu, et al., "Shape and Composition-Controlled Platinum Alloy Nanocrystals Using Carbon Monoxide as Reducing Agent," Nano Letters 11(2), pp. 798-802 (2011).

Wu, et al., "Syntheses of Water-Soluble Octahedral, Truncated Octahedral, and Cubic Pt—Ni Nanocrystals and Their Structure-Activity Study in Model Hydrogenation Reactions," Journal of the American Chemical Society 134(21), pp. 8975-8981 (2012).

Wu, et al., "Truncated Octahedral Pt3Ni Oxygen Reduction Reaction Electrocatalysts," Journal of the American Chemical Society 132(14), pp. 4984-4985 (2010).

Xia, et al,. "Shape-Controlled Synthesis of Metal Nanocrystals: Simple Chemistry Meets Complex Physics?," Angewandte Chemie 48(1), pp. 60-103 (2008).

Xin, et al., "Revealing the Atomic Restructuring of Pt—Co Nanoparticles," Nano Letters 14(6), pp. 3203-3207 (2014).

Yadavali, et al., "Silicon and glass very large scale microfluidic droplet integration for terascale generation of polymer microparticles," Nature Communications 9, 1222, 9 pages (2018).

Yavuz, et al., "Gold nanocages covered by smart polymers for controlled release with near-infrared light," Nature Materials 8, pp. 935-939 (2009).

Yin, et al., "Formation of Hollow Nanocrystals Through the Nanoscale Kirkendall Effect," Science 304(5671), pp. 711-714 (2004).

Zeng, et al., "A Comparison Study of the Catalytic Properties of Au-Based Nanocages, Nanoboxes, and Nanoparticles," Nano Letters 10(1), pp. 30-35 (2010).

Zhang & Xia, "Scaling up the Production of Colloidal Nanocrystals: Should We Increase or Decrease the Reaction Volume?," Advanced Materials 26(16), pp. 2600-2606 (2014).

Zhang, et al., "A Generic Wet Impregnation Method for Preparing Substrate-Supported Platinum Group Metal and Alloy Nanoparticles with Controlled Particle Morphology," Nano Letters 16(1), pp. 164-169 (2016).

Zhang, et al., "Platinum-based nanocages with subnanometer-thick walls and well-defined, controllable facets," Science 349(6246), pp. 412-416 (2015).

Zhang, et al., "Solid-State Chemistry-Enabled Scalable Production of Octahedral Pt—Ni Alloy Electrocatalyst for Oxygen Reduction Reaction," Journal of the American Chemical Society 136(22), pp. 7805-7808 (2014).

Zhang, et al., "Synthesis and Oxygen Reduction Activity of Shape-Controlled Pt3Ni Nanopolyhedra," Nano Letters 10(2), pp. 638-644 (2010).

Miao, et al., "Synthesis of PtCo nanoflowers and its catalytic activity towards nitrobenzene hydrogenation," Catalysis Communications 109, pp. 33-37 (2018).

\* cited by examiner

TEM images and ORR activities tested on RDE

RW084-C-185-1h-A1
Pt:Ni=76.3:23.7
RW084-C-185-1h-A1-200
Pt:Ni=75.5:24.5
RW084-C-185-1h-A1-400
Pt:Ni=75.1:24.9
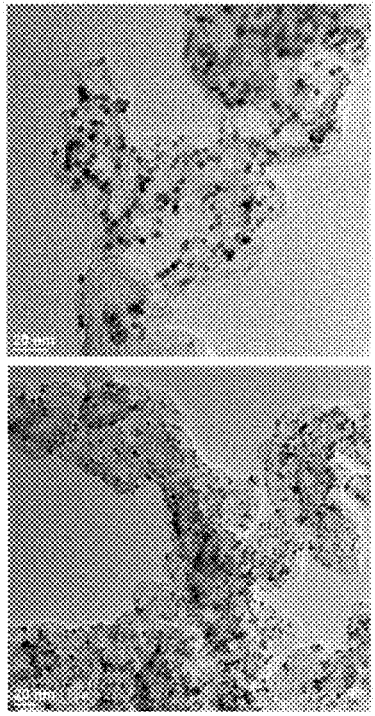
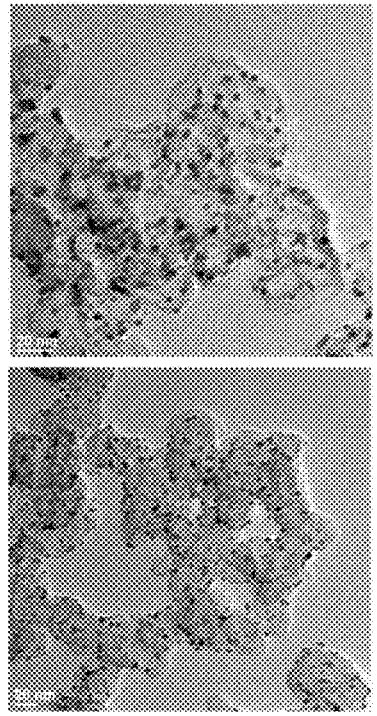
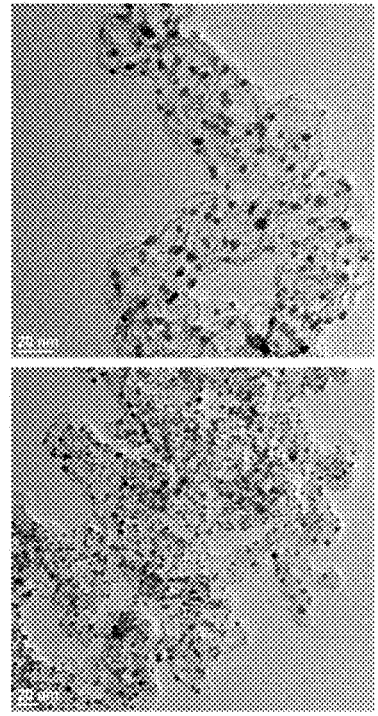
FIG. 8A
FIG. 8B
FIG. 8C RW084-C-185-20h-A1
Pt:Ni=61:39

RW084-C-185-20h-A1-200
Pt:Ni=61:39

RW084-C-185-20h-A1-400
Pt:Ni=61.2:38.8

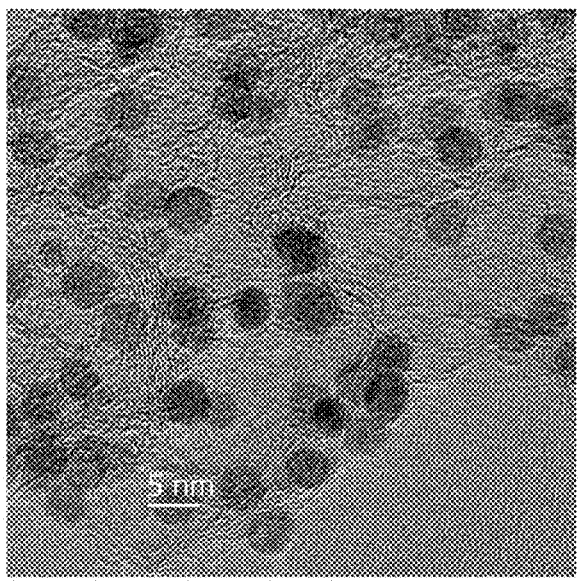
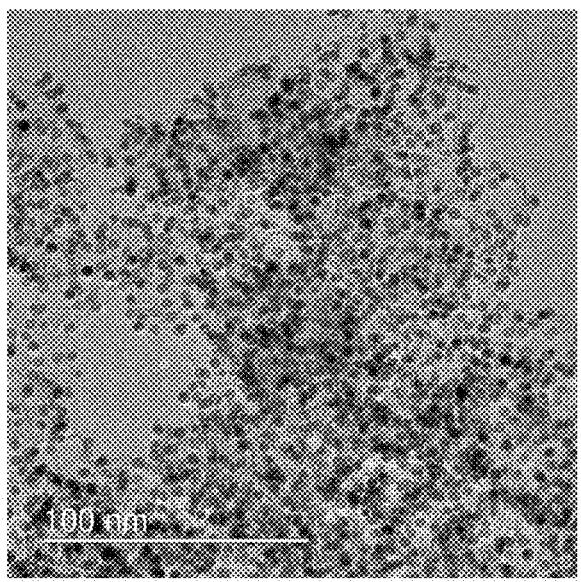
FIG. 13B
FIG. 13C

SEGREGATION INDUCED CORE-SHELL STRUCTURE

CROSS-REFERENCE TO RELATED APPLICATIONS

This application claims priority to and the benefit of U.S. Provisional Patent Application No. 62/966,929, filed Jan. 28, 2020, the content of which is incorporated by reference herein in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to method of synthesizing and compositions for platinum based nanomaterials, particularly platinum nickel core/shell structures.

BACKGROUND

In the last few decades, significant efforts have been devoted to improving the activity and durability of Pt-based nanomaterials for catalyzing reactions aiming to overcome the high price and scarcity problems of Pt-based catalysts. The use of a bimetallic core/shell (or skin) catalyst has been known (e.g., as described in U.S. Pat. No. 9,246,177). Known methods utilize a multistep approach to achieve the platinum skin on the surface of the nanoparticles by undergoing an acid leach and annealing. The anneal step and its attendant high temperatures result in a number of drawbacks, including sintering of particle and change of shape for nanoparticles with specific morphologies during high temperature annealing. Thus, there is a need for a process to induce a Pt skin on a PtNi nanoparticle without the need for an annealing/sintering.

SUMMARY

Embodiments described herein relate generally to oxidative driven segregation induced core/shell structures, including through a process without annealing.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIGS. 8A-8C illustrate results for experimental embodiments. FIG. 8A illustrates RW084-C-185-1h-A1; Pt:Ni=76.3:23.7. FIG. 8B illustrates RW084-C-185-1h-A1-200; Pt:Ni=75.5:24.5. FIG. 8C illustrates RW084-C-185-1h-A1-400; Pt:Ni=75.1:24.9.

FIG. 9A illustrates RW084-C-185-20h-A1; Pt:Ni=61:39. FIG. 9B illustrates RW084-C-185-20h-A1-200; Pt:Ni=61:39. FIG. 9C illustrates RW084-C-185-20h-A1-400; Pt:Ni=61.2:38.8.

FIGS. 13A-13E illustrate results for experimental embodiments of RW103-C-2 double loading with weight % for Pt at 24.7%. No sintering is observed even for double loading sample. Thus high specific surface area (87.1 $m^2/g_{Pt}$) and high specific activity are achieved which guarantee a high mass activity. Results are also shown in Table 3 below.

Figure 1A:
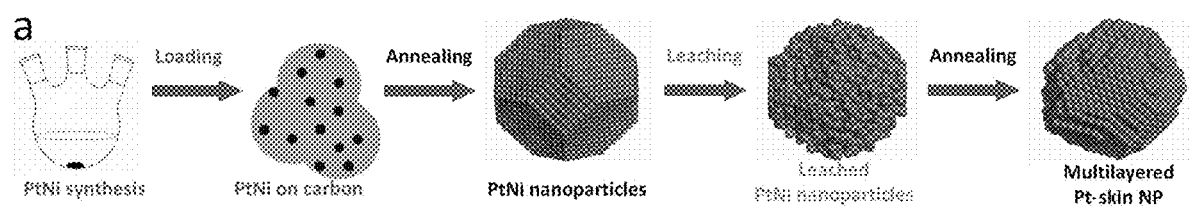
FIG. 1A is a schematic illustration of a prior art multi-step synthesis procedure of multi-layered Pt-skin nanoparticle catalyst.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Figure 1B:
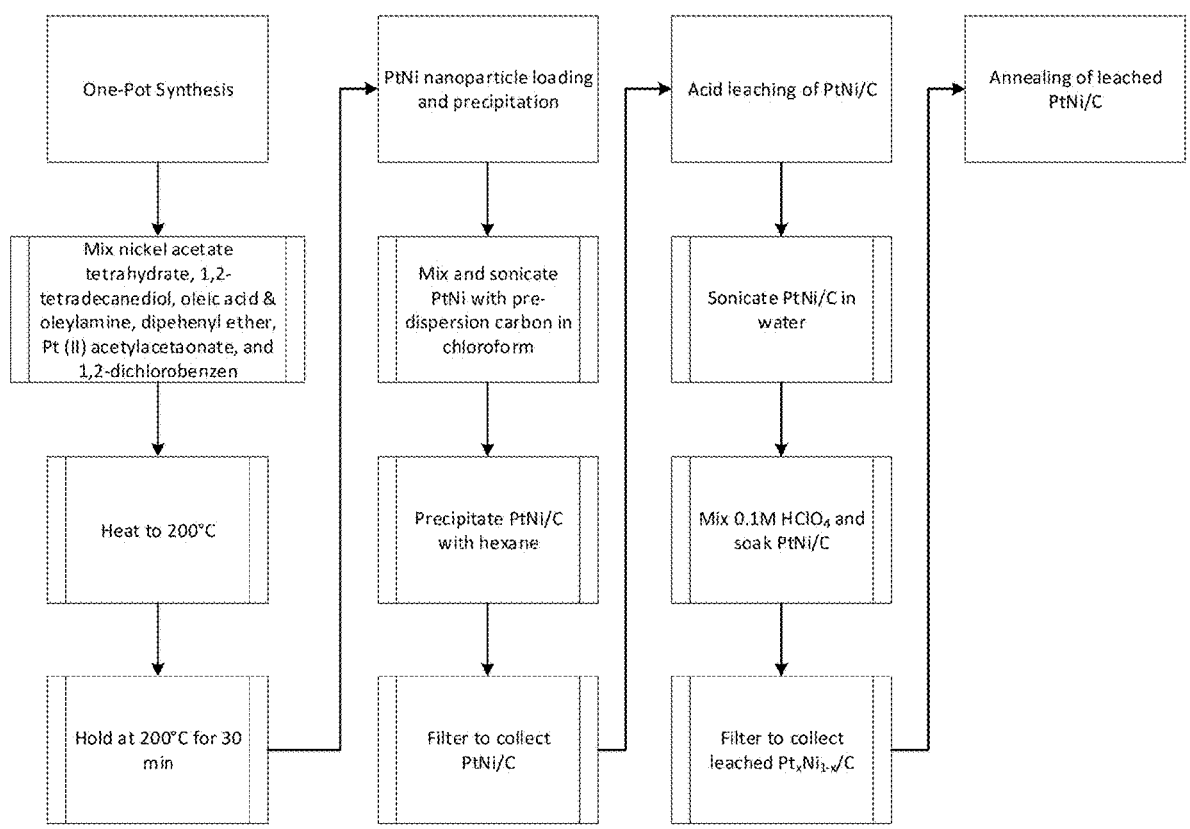
FIG. 1B illustrates a detailed multi-step process for one prior art process for PtNi synthesis.

One embodiment relates to a synthesis process scalable to industrial production. The synthesis process forms the PtNi nanoparticle having a core/shell (skin) structure. Previous work has reported the formation of such core/shell PtNi nanoparticles through a multi-step process (U.S. Pat. No. 9,246,177) and a one-pot process (U.S. patent application Ser. No. 15/966,297) (both incorporated herein by reference). Both processes utilize the formation of PtNi from metal precursors and require high temperature anneal and acid leaching. FIG. 1A-1B illustrate a prior art multi-step technique utilizing annealing and acid leaching.

Figure 2:
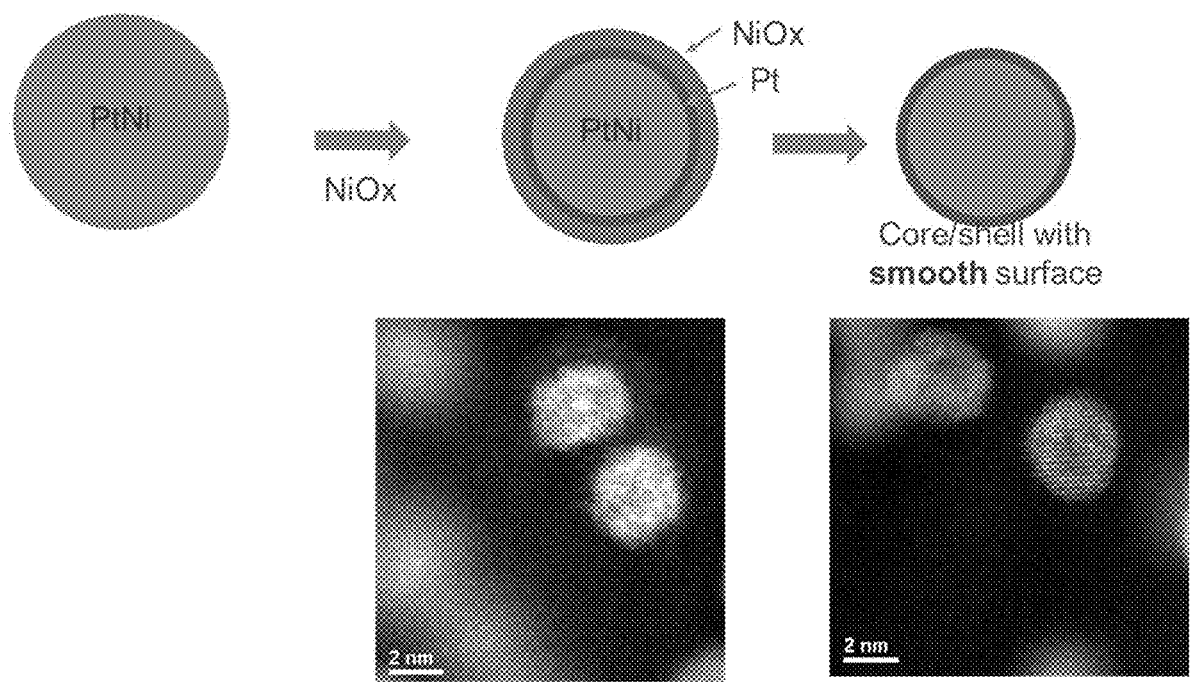
FIG. 2 is a schematic illustration of one embodiment of an oxidation induced segregation method for synthesis of PtNi nanoparticles.
Figure 3A:
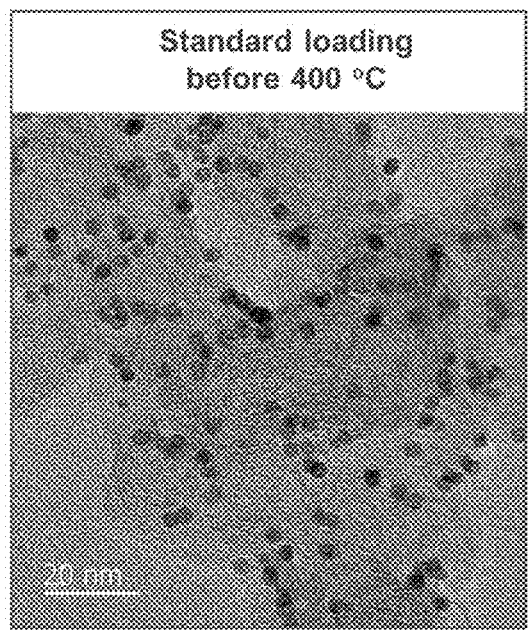
FIG. 3A and FIG. 3B illustrate results for experimental embodiments.
Figure 3B:
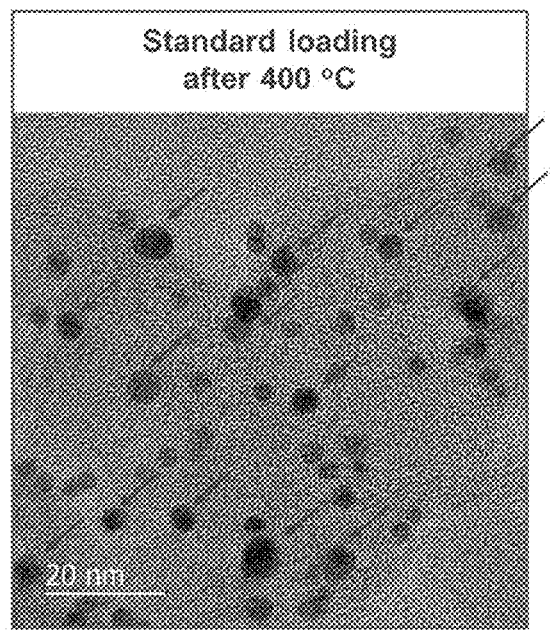

In contrast, FIG. 2 illustrates an embodiment of oxidation induced segregated PtNi core/shell nanoparticle synthesis. The method illustrated includes a first step forming PtNi particles, followed by exposure to air at moderate temperature forming a nickel oxide coating on the PtNi particle. The oxygen from air oxidizes the Ni in PtNi nanoparticle to segregate nickel from an outer portion of the coated PtNi particle, forming a Pt rich skin with a PtNi core.

In a first step, the formation of the PtNi may proceed as a multi-step process (for example, as described in U.S. Pat. No. 9,246,177) or a one-pot process (for example, as described in U.S. patent application Ser. No. 15/966,297). The formation of PtNi particles comprises the addition of a nickel precursor, such as nickel acetate tetrahydrate a reducing agent such as 1,2-tetradecanediol, a surfactant such as oleic acid and/or oleylamine, platinum precursors such as platinum(II) acetylacetonate. In one embodiment, a polar solvent such as 1,2-dichlorobenzene is utilized. In one embodiment, the materials are added without order requirement. Prior to addition to the reactor or reaction vessel, one or more of the materials may be purged with an inert gas at greater than room temperature to remove hydrate water, such as from the nickel precursor. The temperature to remove water could be between 100° C. and 150° C. for several minutes to several hours.

The formation of the PtNi particles proceeds by reacting the above noted materials at a reaction temperature, such as between 195° C. and 205° C. (e.g., 200° C.). Reaction time is 10 min to as long as 2 hours.

In a second step, the PtNi particle is reacted with oxygen, for example forming nickel oxide on the surface of the particle. In the oxygen exposure step, the PtNi particle is coated with nickel oxide by reaction via exposure to oxygen. This may be done at a lower temperature, such as 150° C. to 400° C. in air for nanocages and 150° C. to 300° C. in air for nanoparticles. The oxygen exposure time may be, for example, 1 hours to 20 hours, with the time decreasing for as temperature increases. A longer annealing time may be desired in some embodiments, such as up to two days. The amount of nickel oxide that may be formed is limited by the surface nickel content, thus the ratio of Pt:Ni in the nanoparticle impacts the resultant potential oxide formation. In one embodiment, the reaction of nickel and oxygen runs to completion, such that no exposed nickel remains on the PtNi nanoparticles. The PtNi nanoparticles may have a coating of nickel oxide thereon as a result of the reaction, such coating may be solid or may be intermittent on the surface of the nanoparticles.

In a third step, the nickel oxide coating is removed, resulting in a PtNi core/Pt-skin nanoparticle. The nickel oxide coating may be removed by acid leaching. The acid may be, for example, an equal volume of acid (e.g., $HClO_4$). The material is acid leached for 10 minutes to 24 hours and collected, such as by filtration and washed by water. The collected materials may be dried in a vacuum oven at 80° C. overnight.

The oxidation induced segregation method provides several advantages that are embodied in physical differences between the resultant core/shell nanoparticles of these methods in comparison to prior art leaching/sintering methods.

In one embodiment, the Pt loading is greater than capable under prior methods utilizing an annealing.

The resultant oxidation induced segregated PtNi core/shell nanoparticles exhibit notably higher Pt mass activity.

EXAMPLES

The above described results were obtain based upon the following samples.

Figure 4A:
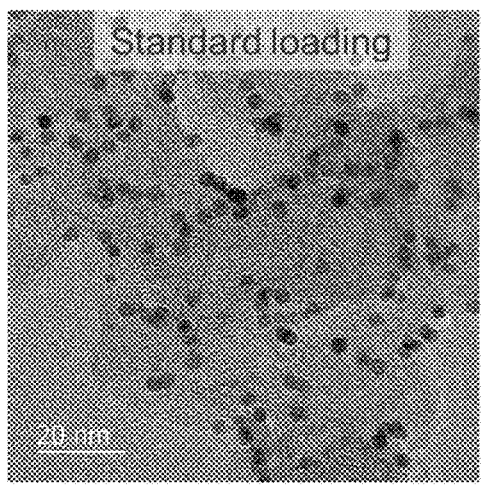
FIG. 4A and FIG. 4B illustrate results for experimental embodiments.
Figure 4B:
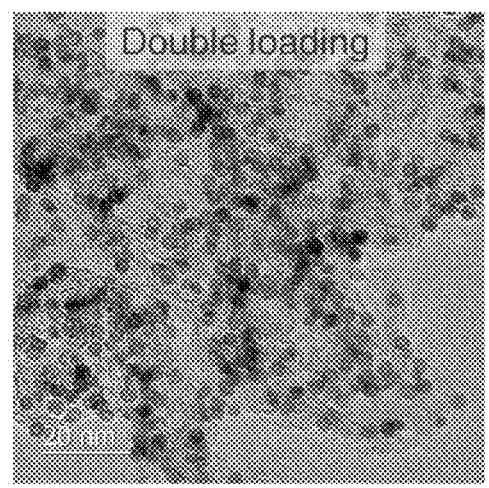
Figure 5A:
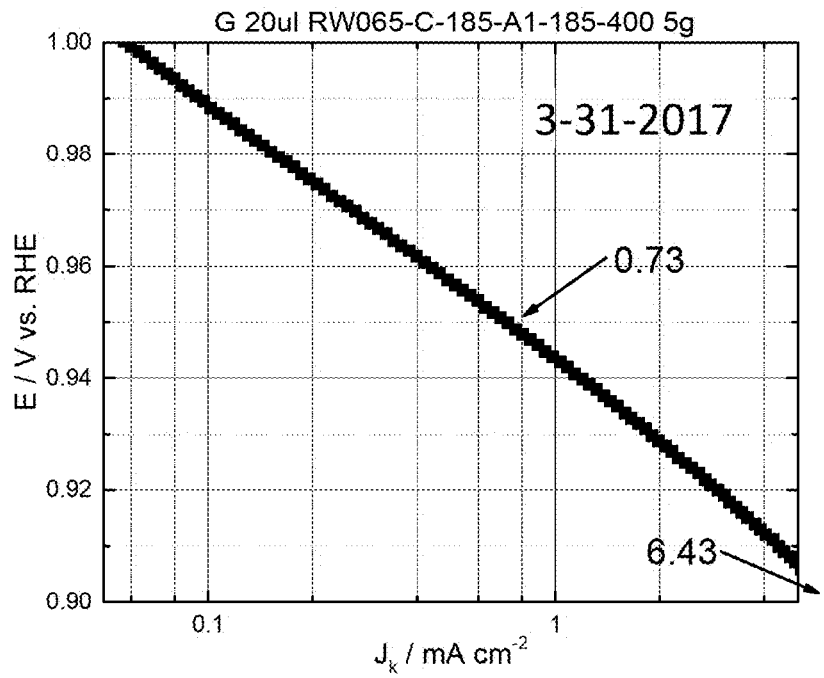
FIGS. 5A-5C illustrate results for experimental embodiments.
Figure 5B:
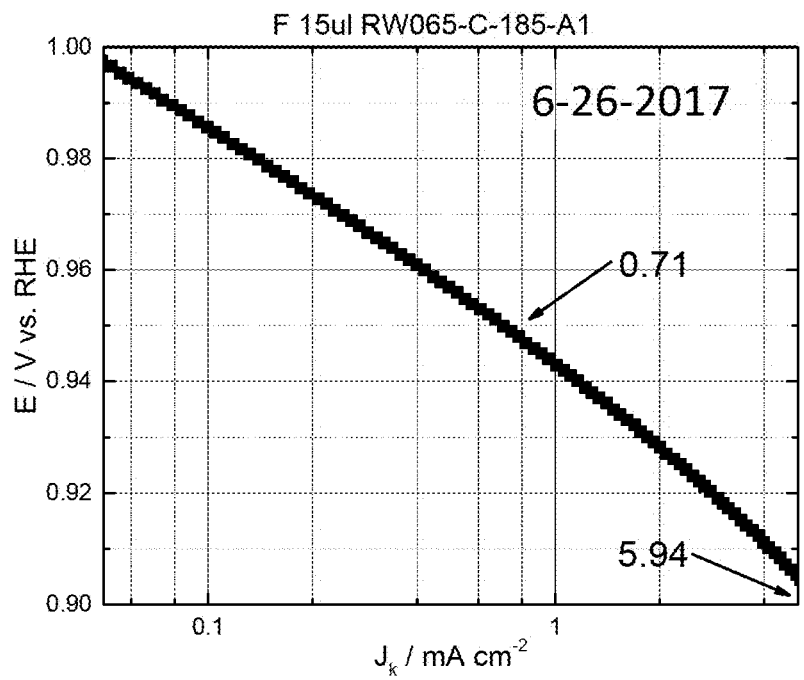
Figure 5C:
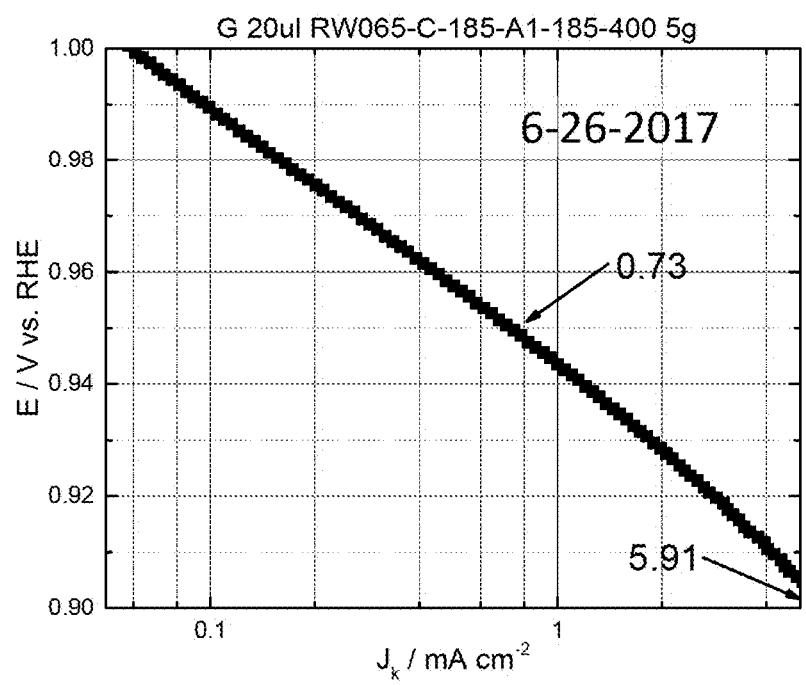
Figure 6A:
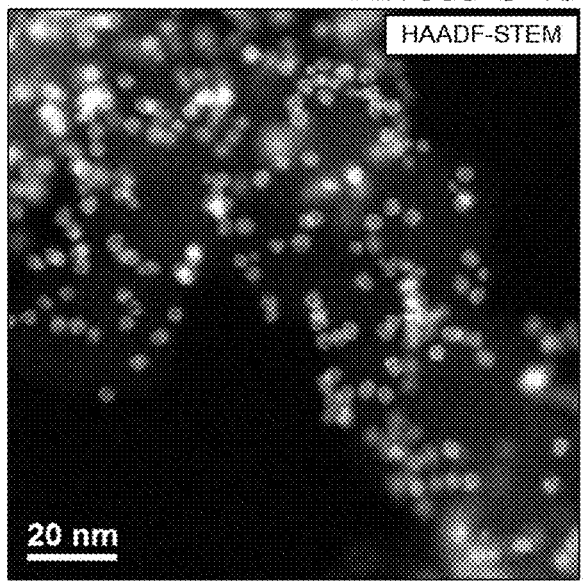
FIG. 6A illustrates HAADF-STEM results for experimental embodiments.
Figure 6B:
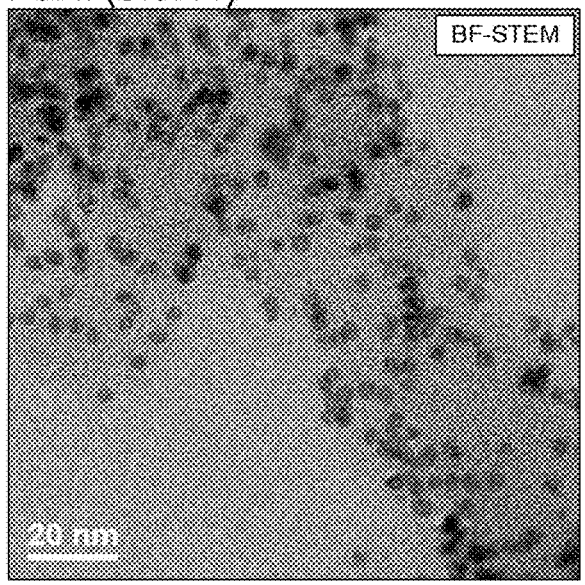
FIG. 6B illustrates BF-STEM results for experimental embodiments.
Figures 7A, 7B, 7C:
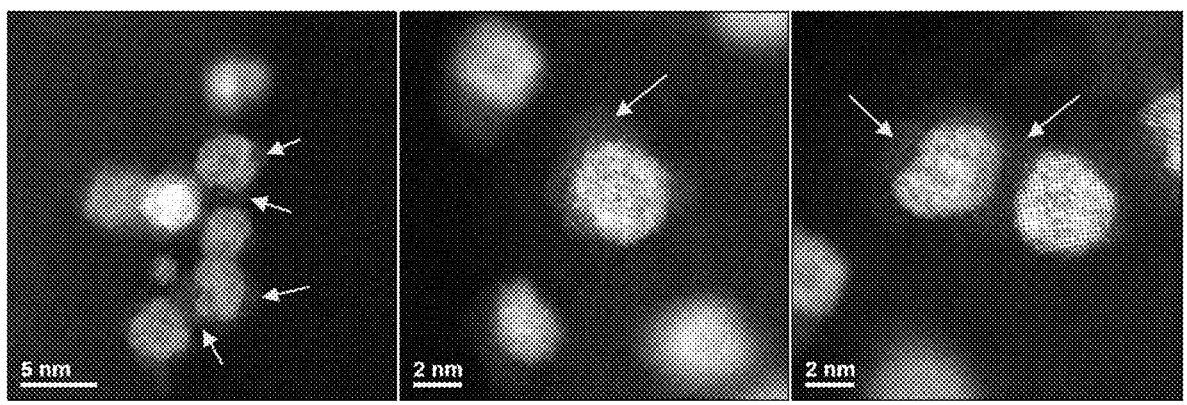
FIGS. 7A-7C illustrate results for experimental embodiments.
Figure 9A:
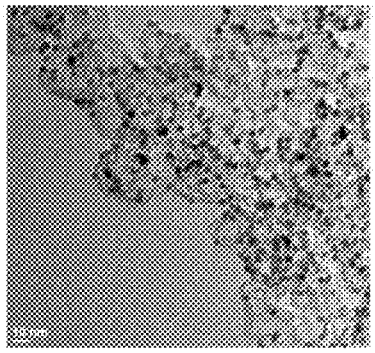
FIGS. 9A-9C illustrate results for experimental embodiments.
Figure 9A:
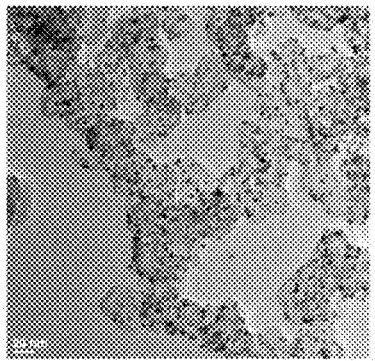
Figure 9B:
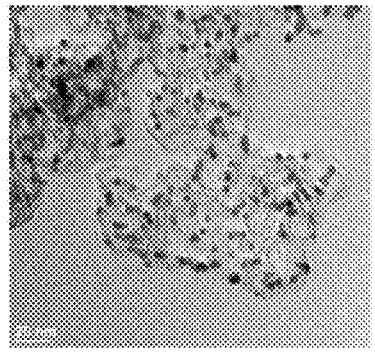
Figure 9B:
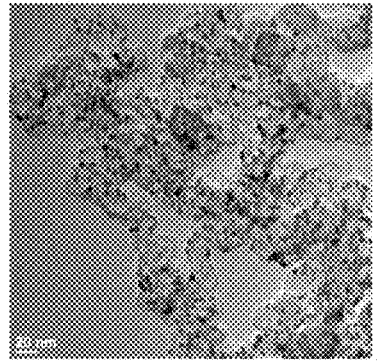
Figure 9C:
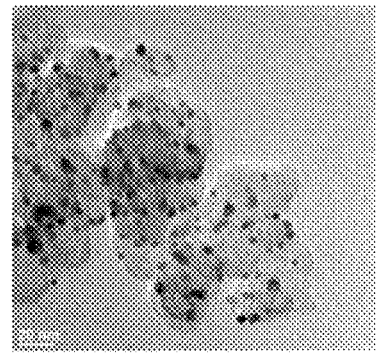
Figure 9C:
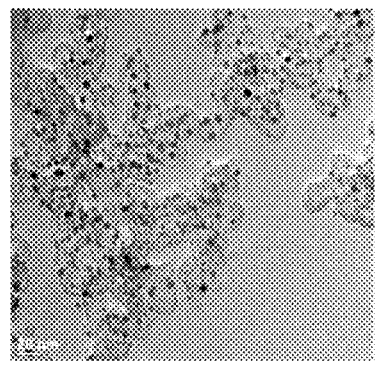
Figure 10A:
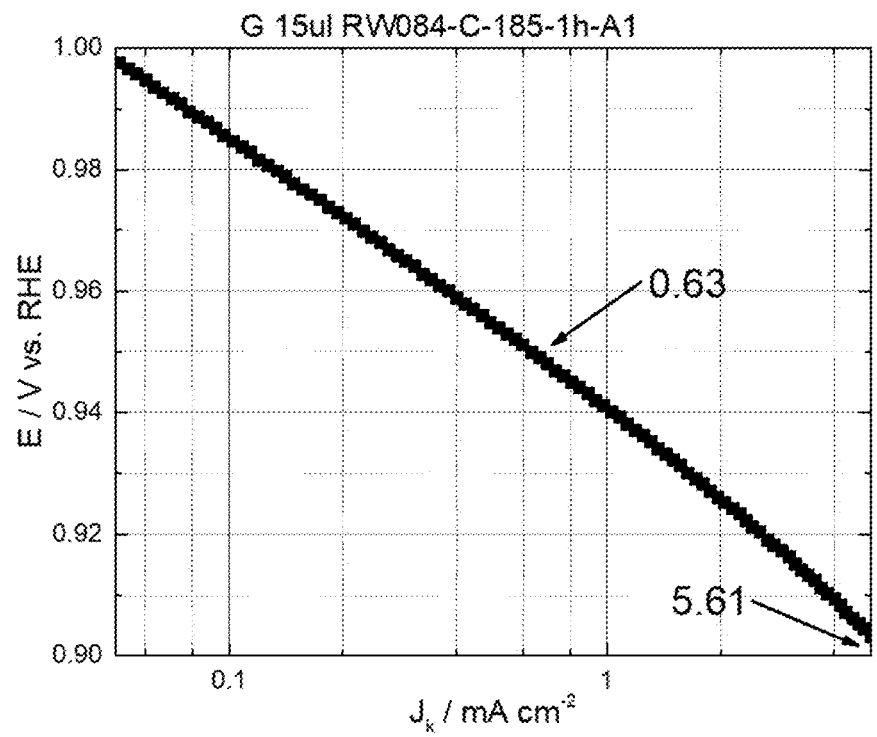
FIGS. 10A-10C illustrate results for experimental embodiments at 185° C. for 1 hour.
Figure 10B:
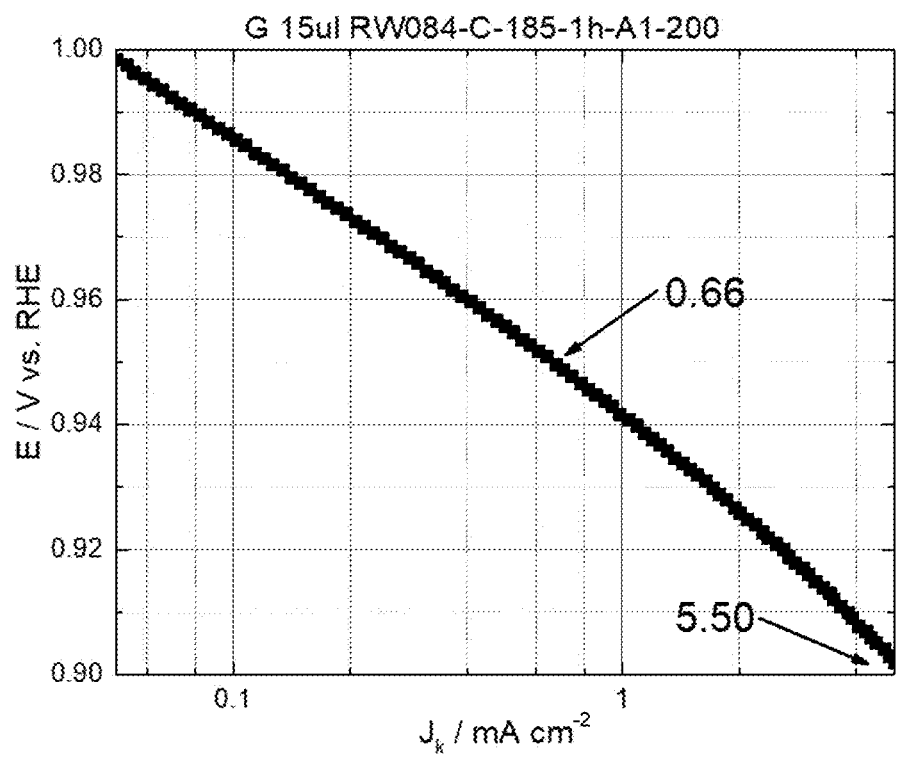
Figure 10C:
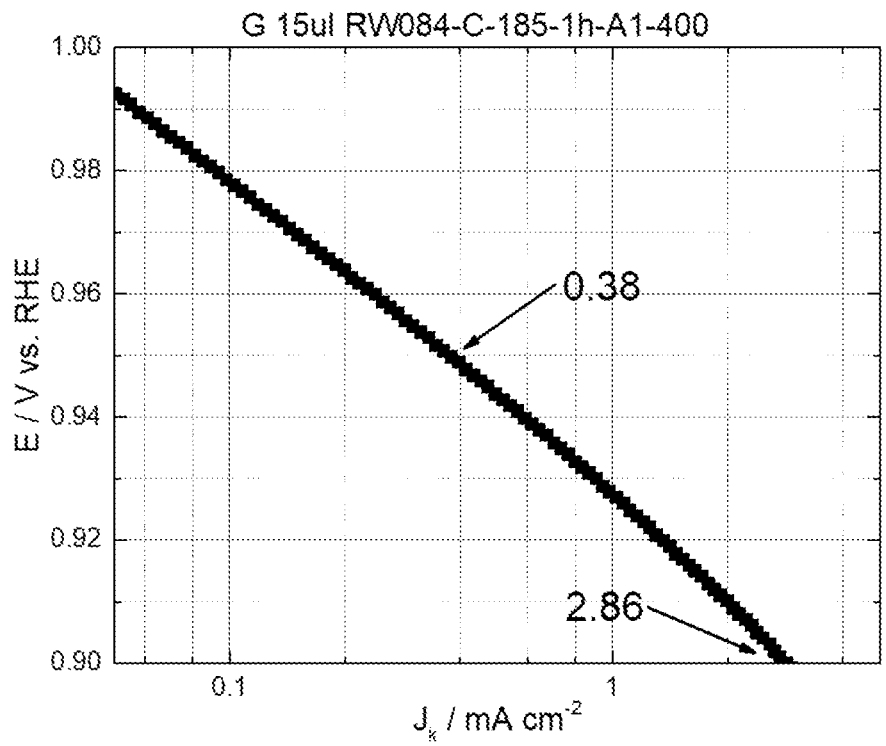
Figure 11A:
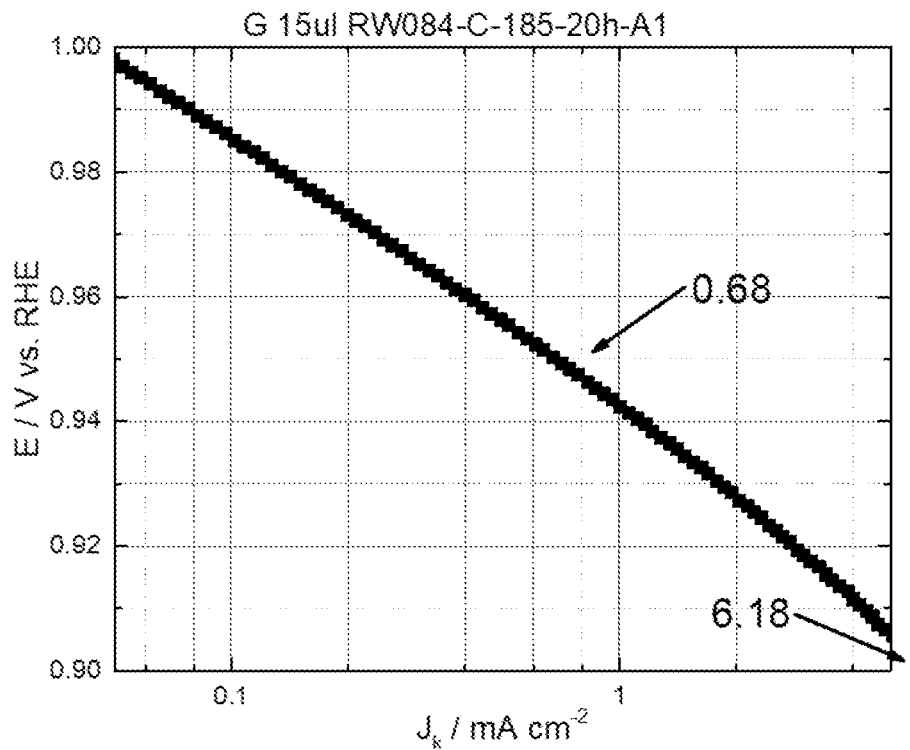
FIGS. 11A-11C illustrate results for experimental embodiments at 185° C. for 20 hours.
Figure 11B:
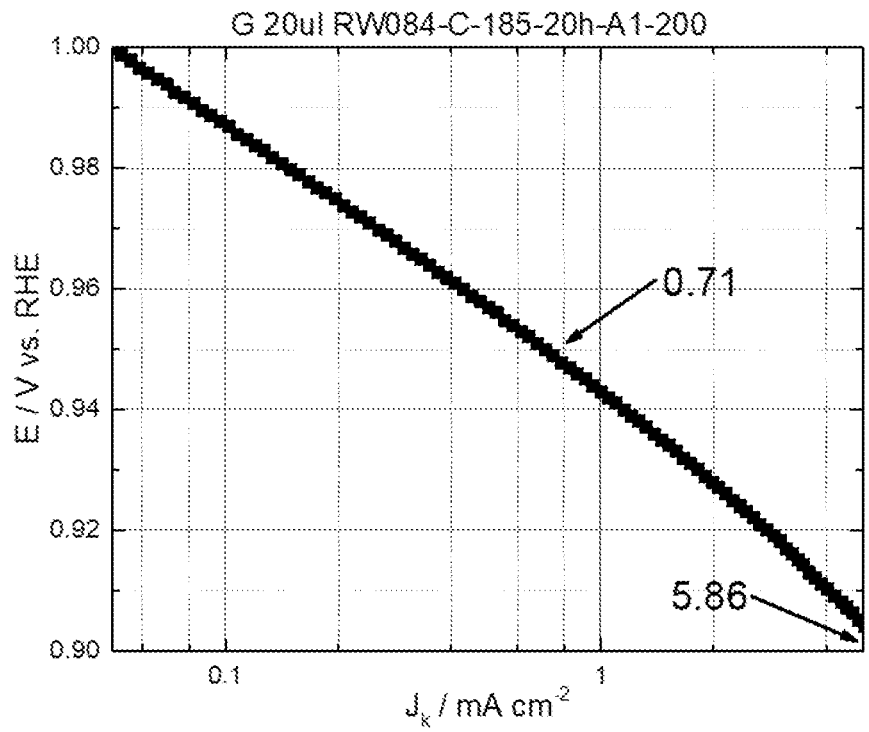
Figure 11C:
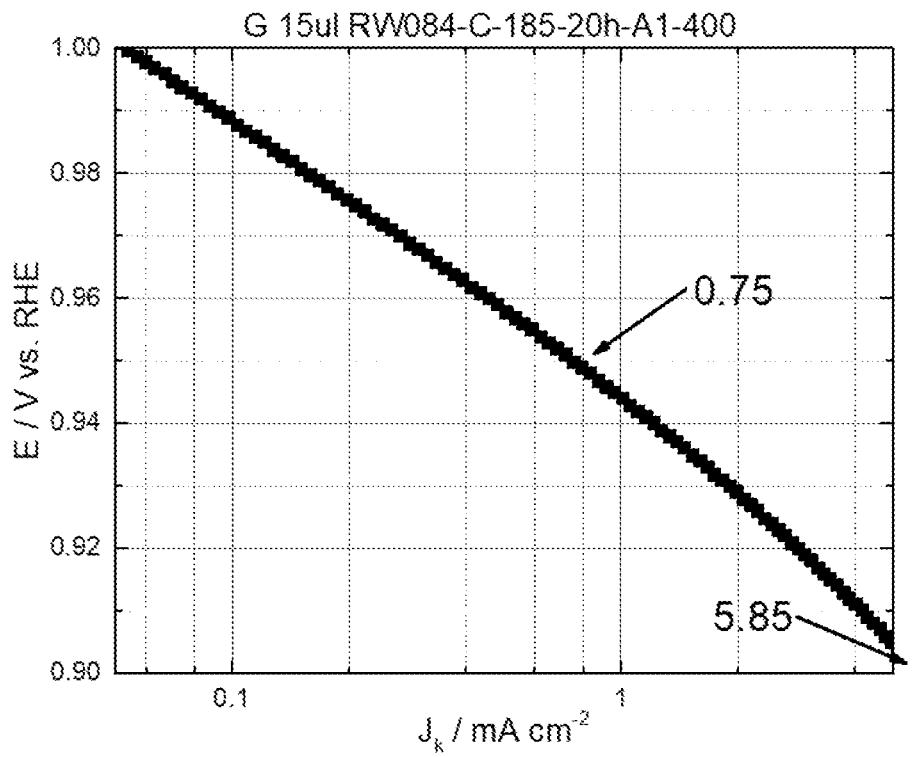
Figure 12A:
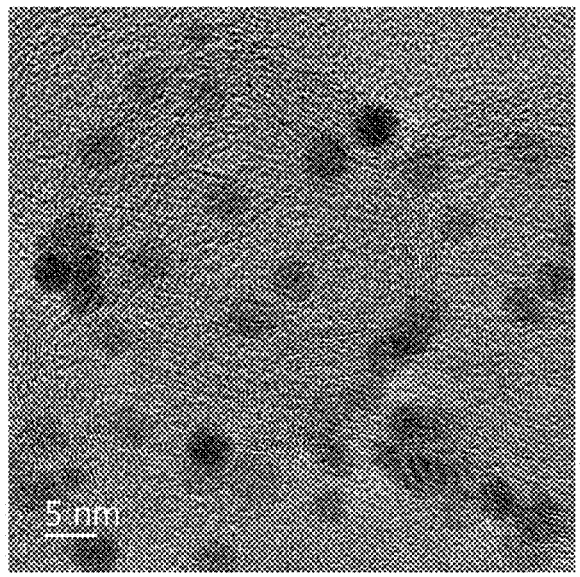
FIG. 12A-12D illustrate results for experimental embodiments of RW103-C-1 standard loading. Results are also shown in Table 2 below.
Figure 12B:
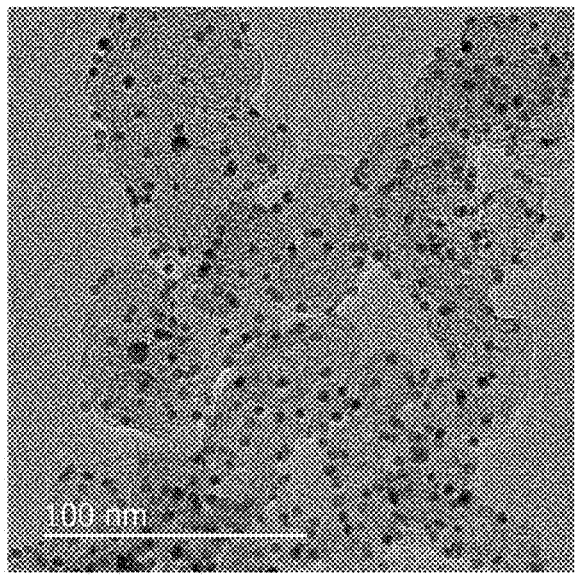
Figure 12C:
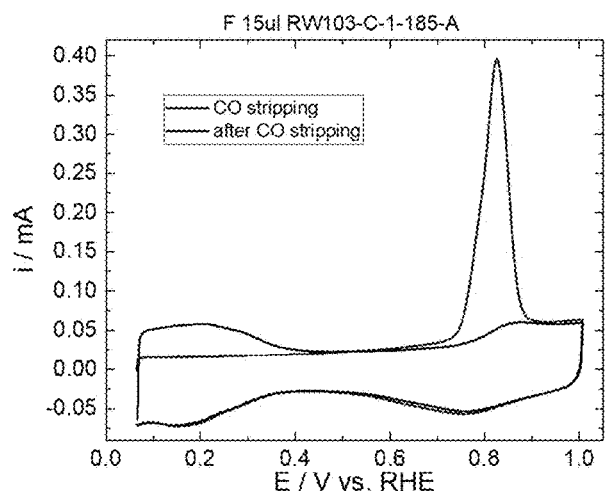
Figure 12D:
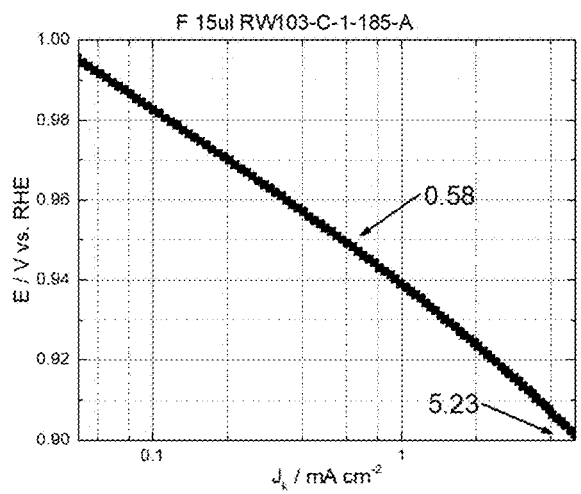
Figure 13A:
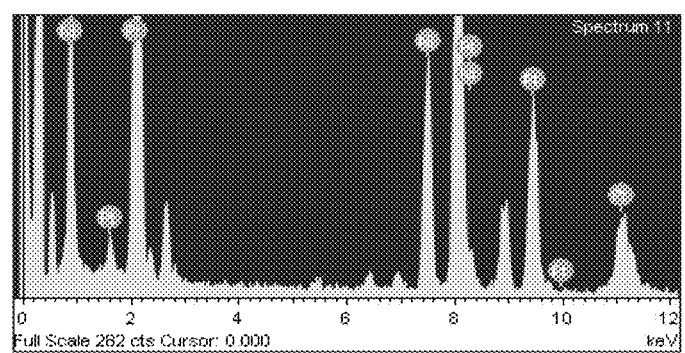
Figure 13D:
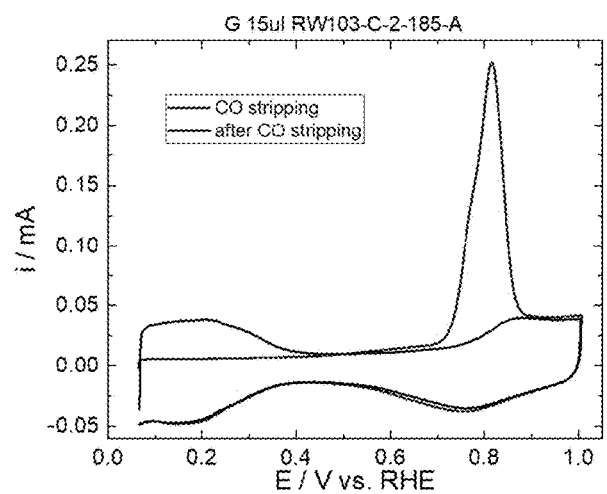
Figure 13E:
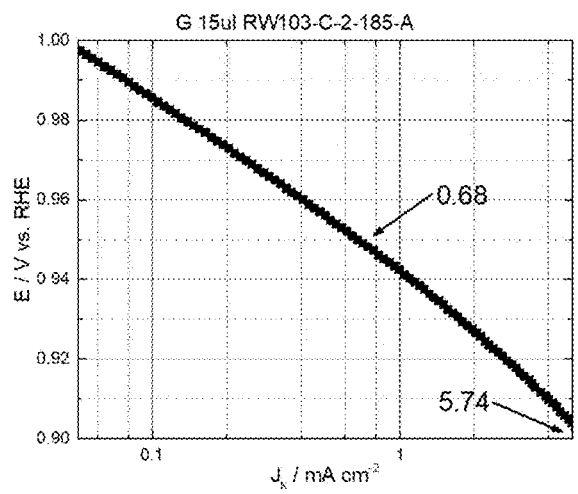

A protocol for synthesizing core/shell particles having a smooth surface without anneal, as shown in FIGS. 4A and 4B show the results of standard loading and double loading. Table 1 below shows the experimental information.

TABLE 1

|  | SSA ($m^2/g$) | 0.9 V ($mA/cm^2$) | 0.95 V ($mA/cm^2$) | 0.9 V (A/mg) | 0.95 V (A/mg) |
|---|---|---|---|---|---|
| Pt/C TKK | 44 | 0.82 | 0.12 | 0.36 | 0.05 |
| Small scale | 40 | 5 | 0.85 | 2 | 0.34 |
| 5g-Batch 1 | 60 | 5.9 | 0.72 | 3.5 | 0.43 |
| 5g-Batch 2 | 64 | 6.4 | 0.73 | 4.1 | 0.46 |
| Standard loading | 97 | 5.2 | 0.58 | 5.1 | 0.56 |
| Double loading | 87 | 5.7 | 0.68 | 5.0 | 0.59 |

The results indicate that higher Pt loading without annealing results in a thinner catalyst layer that provides for lower mass transport resistance in MEA. The process for the experiments proceeded via synthesis of PtNi nanoparticles, loading of PtNi nanoparticles on carbon, coating of nickel oxide layer, removal of nickel oxide layer; and electrochemistry characterization.

Table 2 below shows results for RW103-C-1 standard loading.

TABLE 2

RW1O3-C-1 standard loading.

| ECSAHUPD ($cm^2$) | ECSACO ($cm^2$) | CO/HUPD | Mass (ug) | SSA Pt ($m^2/g$) | jk0.9 ($mA/cm^2$) |
|---|---|---|---|---|---|
| 0.9905 | 1.095 | 1.11 | 1.12 | 97.3 | 5.23 |

| jk0.9 (A/mg) | jk0.95 ($mA/cm^2$) | jk0.95 (A/mg) | ink con (mg/ml) | loading on GC (ug) | Pt mass loading (%) |
|---|---|---|---|---|---|
| 5.09 | 0.58 | 0.56 | 0.50 | 7.52 | 15.0 |

Table 3 below shows results for RW103-C-2 double loading.

TABLE 3

RW1O3-C-2 double loading.

| ECSAHUPD ($cm^2$) | ECSACO ($cm^2$) | CO/HUPD | Mass (ug) | SSA Pt ($m^2/g$) | jk0.9 ($mA/cm^2$) |
|---|---|---|---|---|---|
| 0.7635 | 0.8046 | 1.05 | 0.92 | 87.1 | 5.74 |

| jk0.9 (A/mg) | jk0.95 ($mA/cm^2$) | jk0.95 (A/mg) | ink con (mg/ml) | loading on GC (ug) | Pt mass loading (%) |
|---|---|---|---|---|---|
| 5.0 | 0.68 | 0.59 | 0.25 | 3.74 | 24.7 |

Definitions

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method of synthesizing Pt shell PtNi core nanoparticle comprising the steps of:
    forming a reaction mixture comprising a nickel precursor, a reducing agent, and a surfactant comprising one part oleic acid to two parts oleylamine, a platinum precursor, and a polar solvent;
    reacting the reaction mixture at between 195° C. and 205° C. for at least 10 minutes forming a PtNi nanoparticle solution;
    isolating PtNi nanoparticles from the PtNI nanoparticle solution;
    exposing the PtNi nanoparticles to oxygen;
    forming nickel oxide by reaction of nickel of the PtNi nanoparticles with the oxygen; and
    removing the nickel oxide from at a portion of the PtNi nanoparticles.

2. The method of claim 1, wherein isolation of the PtNi nanoparticles comprises:
    sonicating the PtNi nanoparticle solution with substrate in chloroform solution;
    adding hexane to the sonicated chloroform solution;
    precipitating PtNi nanoparticles; and
    collecting the PtNi nanoparticles by filtration.

3. The method of claim 1, wherein exposing the PtNi nanoparticles comprises exposure at a temperature of 150° C. to 400° C.

4. The method of claim 3, wherein exposing the PtNi nanoparticles comprises exposure at a temperature of 150° C. to 300° C.

5. The method of claim 3, wherein the exposing the PtNi nanoparticles is for 1 to 20 hours.

6. The method of claim 1, wherein removing the nickel oxide is by acid leaching.

7. The method of claim 6, wherein the acid leaching is by exposure of an equal volume of acid to nanoparticle.

8. The method of claim 6, wherein the acid leaching is by exposure to $HClO_4$.

9. A method of synthesizing Pt shell PtNi core nanoparticle comprising the steps of:
    forming a reaction mixture comprising a nickel precursor, a reducing agent, and a surfactant comprising one part oleic acid to two parts oleylamine, a platinum precursor, and a polar solvent;
    reacting the reaction mixture at between 195° C. and 205° C. for at least 10 minutes forming a PtNi nanoparticle solution;
    isolating PtNi nanoparticles from the PtNI nanoparticle solution;
    exposing the PtNi nanoparticles to oxygen at a temperature of 150° C. to 400° C. for 1 to 20 hours;
    forming nickel oxide on a surface of the PtNi nanoparticles by reaction of nickel of the PtNi nanoparticles with the oxygen; and
    removing the nickel oxide from at a portion of the PtNi nanoparticles.

10. The method of claim 9, wherein isolation of the PtNi nanoparticles comprises:
    sonicating the PtNi nanoparticle solution with substrate in chloroform solution;
    adding hexane to the sonicated chloroform solution;
    precipitating PtNi nanoparticles; and
    collecting the PtNi nanoparticles by filtration.

11. The method of claim 9, wherein exposing the PtNi nanoparticles comprises exposure at a temperature of 150° C. to 300° C.

12. The method of claim 9, wherein removing the nickel oxide is by acid leaching.

13. The method of claim 12, wherein the acid leaching is by exposure of an equal volume of acid to nanoparticle.

14. The method of claim 12, wherein the acid leaching is by exposure to $HClO_4$.

* * * * *